Oct. 31, 1950      L. J. SPILLANE      2,527,660
METHACRYLONITRILE PURIFICATION
Filed July 12, 1949
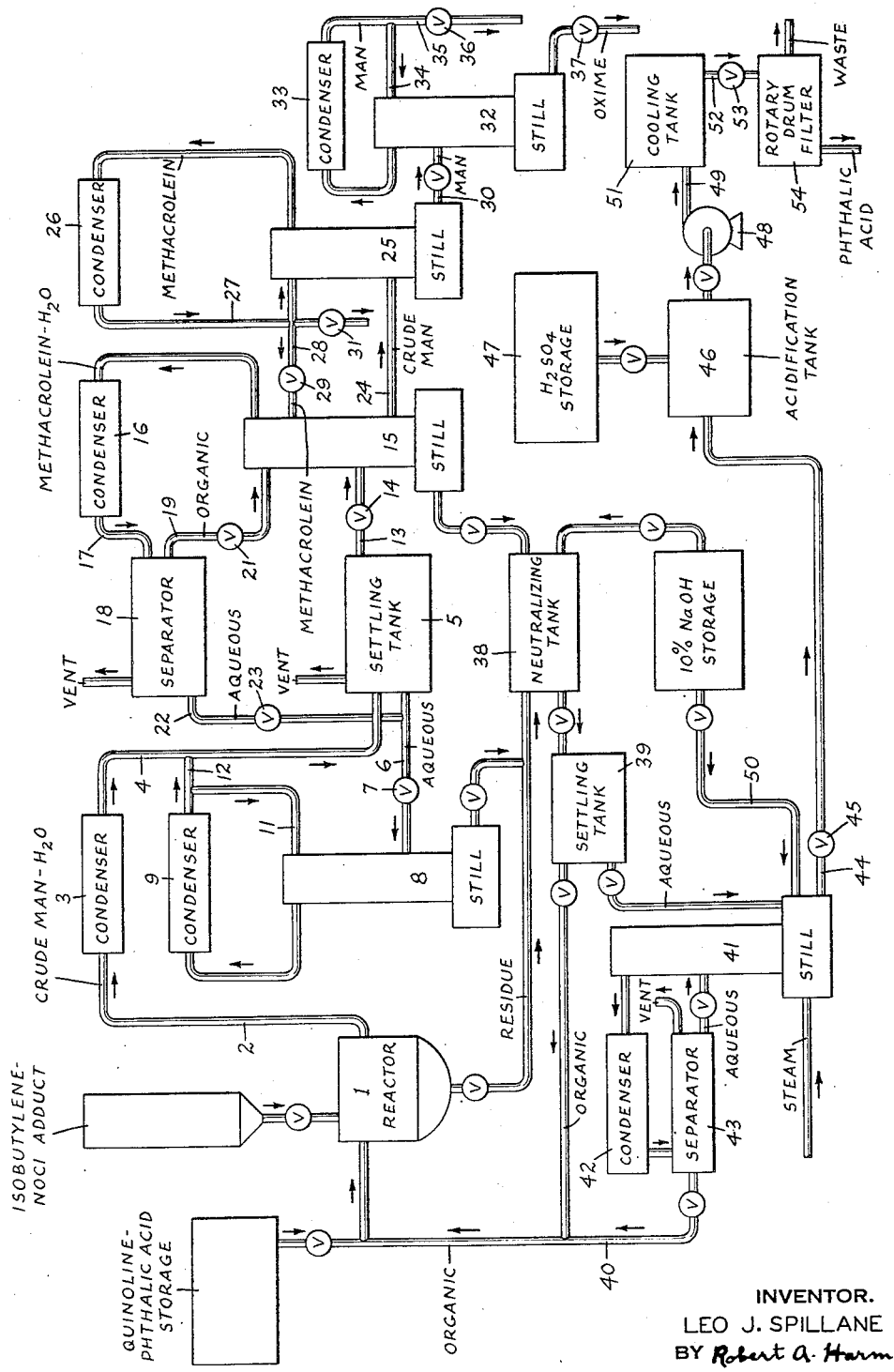
INVENTOR.
LEO J. SPILLANE
BY Robert A. Harman
ATTORNEY.

Patented Oct. 31, 1950

2,527,660

UNITED STATES PATENT OFFICE 2,527,660

METHACRYLONITRILE PURIFICATION

Leo J. Spillane, Rockaway Township, Morris County, N. J., assignor to Allied Chemical & Dye Corporation, New York, N. Y., a corporation of New York Application July 12, 1949, Serial No. 104,231

6 Claims. (Cl. 260—465.9)

This invention relates to treatment of crude methacrylonitrile synthesis mixtures, in particular, mixtures obtained in the synthesis of methacrylonitrile from isobutylene-nitrosyl chloride adduct.

The methacrylonitrile synthesis mixtures above referred to contain as impurities chiefly methacrolein, methacrylaldoxime, the hydrochloric acid salt of tertiary nitrogen base dehydrohalogenating agent, catalytic organic acid such as phthalic acid and water. It is desired to obtain from these mixtures pure, dry methacrylonitrile and to recover the tertiary nitrogen base and catalytic acid for reuse.

In accordance with my invention methacrolein, distilled from methacrylonitrile synthesis mixtures, removes water as an aqueous azeotrope; the distillate is allowed to separate into a methacrolein layer and an aqueous layer; methacrolein from the distillate is returned to serve as additional azeotropic agent for removal of water from methacrylonitrile synthesis mixture; and dried crude methacrylonitrile is fractionated to separate purified methacrylonitrile. Ready separation of water from methacrylonitrile is thereby obtained, notwithstanding the fact that water and methacrylonitrile themselves form a low-boiling azeotrope.

As a further feature of my invention, aqueous residues of reaction and of distillation of the above methacrylonitrile synthesis mixtures are treated with a quantity of alkali, such as sodium hydroxide or sodium carbonate, equivalent to the hydrogen chloride contained in these residues; the resulting organic layer containing nitrogen base and catalytic acid is separated; and the aqueous layer is treated with a further quantity of alkali and steam distilled to remove all residual organic base. Complete removal of organic base permits recovery of considerable additional quantities of organic catalytic acid from the aqueous residues. The aqueous residue is acidified and residual catalytic organic acid which crystallizes is removed.

A specific embodiment of my invention will now be described with reference to the accompanying diagrammatic flow sheet illustrating the same.

Into reactor 1 containing quinoline-phthalic acid mixture maintained at a temperature of approximately 180° C., isobutylene-nitrosyl chloride adduct is introduced at a rate to maintain the temperature. A crude methacrylonitrile synthesis mixture is thereby produced.

Methacrylonitrile and other relatively volatile constituents of the synthesis mixture are vaporized in the reactor and pass through line 2 to condenser 3 and thence through line 4 to settling tank 5. In the settling tank an organic upper layer and an aqueous lower layer are formed. The aqueous layer is drawn off through line 6 controlled by valve 7 into still 8 wherein volatile organic compounds and water are taken off overhead at temperatures up to about 100° C. The exit vapors are condensed in condenser 9 and are separated in condenser 16 whence the distillate passes via line 17 to phase separator 18. The organic layer in phase separator 18, which consists principally of methacrolein saturated with water, is returned via line 19 and valve 21 to still 15. The aqueous layer from separator 18 passes via line 22 and valve 23 to still 8.

In still 15 crude methacrylonitrile fractions containing methacrolein and constituents boiling above methacrylonitrile are taken off as side stream at temperatures about 72–123° C. and passed via line 24 to still 25. Still 25 separates overhead at about 67–85° C. methacrolein fractions which are condensed in condenser 26 from which a part of the condensate is returned to still 25 as reflux via line 27. Fractions of this distillate coming off above about 72° C. contain appreciable amounts of methacrylonitrile. Such fractions are passed from condenser 26 via line 28 and valve 29 to still 15 and serve to enrich the distilland in still 15 with methacrolein. Methacrolein product is removed from the system via valve 31.

Methacrylonitrile is withdrawn as residue from still 25 and passed via line 30 to still 32 wherein it is fractionated to separate it from impurities. The methacrylonitrile distillate coming off about 85–90° C. is condensed in condenser 33 from which a part returns to still 32 via line 34 as reflux and the remainder is drawn off via line 35 and valve 36 as product. Residues from still 32, principally methacrolein oxime, are drawn off from the system via valve 37.

The non-volatile residue from reactor 1 and the still residues from stills 8 and 15 are passed into neutralizing tank 38 wherein they are contacted with a quantity of 10% caustic soda solution equivalent to the hydrogen chloride combined with the tertiary nitrogen base (quinoline fraction) contained in these residues. The neutralized mixture is passed to settling tank 39, suitably maintained at temperatures somewhat above room temperatures, e. g. 50°–80° C. In the settling tank, an organic layer containing most of the organic base in the residues and about 75% of the phthalic acid in the residues separates as an upper layer. This upper layer is returned to the reactor for reuse. Instead of caustic soda, other alkali such as sodium carbonate may be used in the neutralizations.

The aqueous layer from settling tank 39 is passed to still 41 wherein it is contacted with an additional quantity of 10% caustic soda solution added from storage via line 50, amounting to about 20% of that employed in neutralizing tank 38. The resulting mixture is steam distilled to separate residual quinoline, which is condensed in condenser 42 and passed to separator 43. The organic layer from separator 43 is returned via line 40 to reactor 1 and the aqueous layer is returned to still 41.

The residues from still 41, after all quinoline has been distilled out, pass via line 44 and valve 45 to acidification tank 46 wherein they are acidified to pH of about 2 with sulfuric acid from storage tank 47. The slurry of phthalic acid formed in acidification tank 46 is pumped by pump 48 through line 49 to cooling tank 51 wherein further phthalic acid crystallizes. The crystallization slurry from tank 51 is passed via line 52 and valve 53 to the rotary drum filter 54 which separates the mother liquors as waste from the recovered phthalic acid. The recovered phthalic acid is returned to the reactor for reuse.

Suitable pumps, drains, valves, surge tanks, controlling instruments, conveyors and the like may be introduced where desired to facilitate operation as above described.

It will be obvious to those skilled in the art that many modifications and changes may be made in the process specifically described above without departure from the scope of my invention.

I claim:

1. A process for treatment of crude methacrylonitrile synthesis mixtures derived from isobutylene-nitrosyl chloride adduct which comprises separating such mixture into aqueous and methacrylonitrile layers; fractionating out from methacrylonitrile layer a mixture of water and methacrolein by-products present therein; cooling the resulting distillate to form an aqueous layer and a methacrolein layer; returning methacrolein from said methacrolein layer to organic layer of crude methacrylonitrile synthesis mixture and continuing fractionation of said organic layer to remove further quantities of water therefrom; withdrawing crude methacrylonitrile thus freed of water; and further fractionating said methacrylonitrile, separating methacrolein therefrom and obtaining substantially pure methacrylonitrile.

2. Process as defined in claim 1 wherein aqueous layers from said crude methacrylonitrile synthesis mixture and from distillates containing methacrolein-water azeotrope are fractionated; the resulting distillate in turn is separated into aqueous and organic layers; aqueous layer last mentioned is recycled to fractionation; organic layer is combined with organic layers of crude methacrylonitrile synthesis mixture for removal of water therefrom; and aqueous distillation residues are withdrawn.

3. Process as defined in claim 1 wherein methacrolein separated by fractionation from dried crude methacrylonitrile is withdrawn from the system, and intermediate methacrolein-methacrylonitrile fractions distilled from dried crude methacrylonitrile are recycled to crude wet methacrylonitrile fractionation.

4. Process as defined in claim 1 wherein aqueous residues from methacrylonitrile synthesis and from distillations of rude methacrylonitrile are intermixed with an alkali in amount equivalent to the hydrogen chloride content of said residues; the resulting mixture is separated into an organic base layer which is drawn off and an aqueous layer which is made alkaline and steam distilled to separate residual organic base contained therein; aqueous residue of steam distillation is acidified and organic acid is crystallized therefrom; and organic base and acid thus recovered are recycled to methacrylonitrile synthesis.

5. Process as defined in claim 4 wherein liberation of organic base from its hydrochloride is effected with caustic soda solution and separation of organic base layer from aqueous layer is carried out at temperatures of about 50°–80° C.

6. A process of dehydrating methacrylonitrile containing water and methacrolein, which comprises distilling a mixture of methacrylonitrile, water and methacrolein, thereby obtaining a distillate enriched in water and methacrolein and a residue enriched in methacrylonitrile, separating at least a portion of the methacrolein from the distillate, introducing separated methacrolein into mixture being distilled, and continuing distillation until substantially all the water is removed from the methacrylonitrile.

LEO J. SPILLANE.

REFERENCES CITED

The following references are of record in the file of this patent:

UNITED STATES PATENTS

| Number | Name | Date |
| --- | --- | --- |
| 2,263,436 | Britton et al. | Nov. 18, 1941 |
| 2,404,163 | Carpenter | July 16, 1946 |
| 2,471,927 | Bortnick et al. | Mar. 31, 1949 |
| 2,471,928 | Bortnick et al. | May 31, 1949 |
| 2,471,994 | Wooster | May 31, 1949 |